US010131814B2

(12) United States Patent
Berger et al.

(10) Patent No.: US 10,131,814 B2
(45) Date of Patent: Nov. 20, 2018

(54) RADIATION-CURABLE WATER-DISPERSIBLE POLYURETHANE (METH)ACRYLATES

(71) Applicant: BASF SE, Ludwigshafen (DE)

(72) Inventors: Sebastian Berger, Ann Arbor, MI (US); Peter Thuery, Ludwigshafen (DE); Kenneth Shaun Tranter, Wachenheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/914,426

(22) PCT Filed: Aug. 22, 2014

(86) PCT No.: PCT/EP2014/067880
§ 371 (c)(1),
(2) Date: Feb. 25, 2016

(87) PCT Pub. No.: WO2015/028397
PCT Pub. Date: Mar. 5, 2015

(65) Prior Publication Data
US 2016/0200938 A1    Jul. 14, 2016

(30) Foreign Application Priority Data

Aug. 26, 2013 (EP) .................................. 13181721

(51) Int. Cl.
*C09D 175/14* (2006.01)
*C09D 11/102* (2014.01)
*C08G 18/28* (2006.01)
*C08G 18/66* (2006.01)
*C08G 18/81* (2006.01)
*C08G 18/73* (2006.01)
*C08G 18/67* (2006.01)
*C08G 18/08* (2006.01)
*C09D 175/16* (2006.01)
*C08G 18/42* (2006.01)
*C09D 11/101* (2014.01)

(52) U.S. Cl.
CPC ....... *C09D 175/14* (2013.01); *C08G 18/0823* (2013.01); *C08G 18/283* (2013.01); *C08G 18/2815* (2013.01); *C08G 18/4216* (2013.01); *C08G 18/6674* (2013.01); *C08G 18/672* (2013.01); *C08G 18/73* (2013.01); *C08G 18/8125* (2013.01); *C08G 18/8175* (2013.01); *C09D 11/101* (2013.01); *C09D 11/102* (2013.01); *C09D 175/16* (2013.01)

(58) Field of Classification Search
CPC .. C09D 11/101; C09D 11/102; C09D 175/14; C09D 175/16; C08G 18/672; C08G 18/0823; C08G 18/42; C08G 18/2815; C08G 18/283; C08G 18/4216; C08G 18/6674; C08G 18/73; C08G 18/8125; C08G 18/8175

USPC ......... 428/423.1, 423.7, 424.8, 425.1, 425.6, 428/425.8, 425.9; 528/44; 427/553
See application file for complete search history.

(56) References Cited

U.S. PATENT DOCUMENTS

| | | | |
|---|---|---|---|
| 4,596,678 A | 6/1986 | Merger et al. | |
| 4,596,679 A | 6/1986 | Hellbach et al. | |
| 5,087,739 A | 2/1992 | Bohmholdt et al. | |
| 2004/0006152 A1* | 1/2004 | Weikard | C08G 18/0823 522/162 |
| 2008/0145563 A1 | 6/2008 | Heischkel et al. | |
| 2008/0275155 A1* | 11/2008 | Wagner | C08G 18/0828 522/174 |
| 2009/0269568 A1* | 10/2009 | Kuhlmann | C08G 18/0823 428/220 |
| 2012/0225968 A1* | 9/2012 | Nakano | C08F 299/06 522/16 |
| 2015/0225606 A1* | 8/2015 | Berger | C08G 18/6659 428/425.1 |

FOREIGN PATENT DOCUMENTS

| | | |
|---|---|---|
| DE | 29 36 039 A1 | 4/1981 |
| DE | 40 10 783 A1 | 10/1991 |
| DE | 41 13 160 A1 | 10/1992 |
| DE | 196 18 720 A1 | 11/1996 |
| DE | 195 25 489 A1 | 1/1997 |
| DE | 197 24 199 A1 | 12/1998 |
| DE | 198 10 793 A1 | 9/1999 |
| DE | 198 26 712 A1 | 12/1999 |
| DE | 199 13 353 A1 | 9/2000 |
| DE | 199 33 012 A1 | 1/2001 |
| DE | 199 57 604 A1 | 5/2001 |
| DE | 199 57 900 A1 | 6/2001 |
| DE | 100 13 186 A1 | 9/2001 |
| DE | 100 13 187 A1 | 10/2001 |
| DE | 10 2010 001 956 A1 | 8/2010 |
| DE | 10 2010 003 308 A1 | 1/2011 |
| EP | 0 057 474 A2 | 8/1932 |
| EP | 0 098 752 A2 | 1/1934 |
| EP | 0 126 299 A1 | 11/1934 |
| EP | 0 007 508 A2 | 2/1980 |
| EP | 0 126 300 A1 | 11/1984 |
| EP | 0 355 443 A2 | 2/1990 |
| EP | 0 495 751 A1 | 7/1992 |

(Continued)

OTHER PUBLICATIONS

International Search Report dated Oct. 31, 2014 in PCT/EP2014/067880.
Written Opinion dated Oct. 31, 2014 in PCT/EP2014/067880.

*Primary Examiner* — Thao T Tran
(74) *Attorney, Agent, or Firm* — Oblon, McClelland, Maier & Neustadt, L.L.P.

(57) ABSTRACT

The present invention relates to radiation-curable, water-dispersible polyurethane (meth)acrylates, to coating compositions comprising the latter, to the use thereof and to the process for production thereof.

17 Claims, No Drawings

(56) References Cited

FOREIGN PATENT DOCUMENTS

| | | |
|---|---|---|
| EP | 0 548 669 A2 | 6/1993 |
| EP | 0 615 980 A2 | 9/1994 |
| EP | 0 694 531 A2 | 1/1996 |
| EP | 0 703 255 A1 | 3/1996 |
| EP | 1 591 502 A1 | 11/2005 |
| EP | 2 316 867 A1 | 5/2011 |
| WO | WO 98/33761 A1 | 8/1998 |
| WO | WO 03/035596 A2 | 5/2003 |
| WO | WO 2004/029121 A1 | 4/2004 |
| WO | WO 2004/076519 A1 | 9/2004 |
| WO | WO 2004/076520 A1 | 9/2004 |
| WO | WO 2006/089935 A1 | 8/2006 |
| WO | WO 2008/098972 A1 | 8/2008 |
| WO | WO 2010/018074 A1 | 2/2010 |
| WO | WO 2010/063612 A1 | 6/2010 |
| WO | WO 2014/063920 A1 | 5/2014 |

\* cited by examiner

RADIATION-CURABLE WATER-DISPERSIBLE POLYURETHANE (METH)ACRYLATES

The present invention relates to radiation-curable, water-dispersible polyurethane (meth)acrylates, to coating compositions comprising the latter, to the use thereof and to the process for production thereof.

Water-dispersible urethane acrylates are already known, for example from EP-A 98 752 or DE-A 2 936 039. The hydrophilicity of these known systems is based on the presence of ionic sites, especially of carboxylate or sulfonate groups, which have alkali metal cations or ammonium ions as counterions. The amines which are often present (for neutralization or to increase the molar mass) can cause yellowing of the coating compositions. However, the target molecular mass is required to lower the tackiness of the films.

Radiation-curable water-emulsifiable polyurethane (meth)acrylates are known, for example, from EP 694531 A2, DE 19525489 A1, DE 19810793 A1, DE 19933012 A1, DE 19957604 A1 or EP 1591502 A1.

A common factor for all the products obtainable from the documents cited is that the preparation of the polyurethane (meth)acrylates described therein involves reaction with at least one di- or polyamine.

DE 10 2010 003308 describes water-emulsifiable urethane (meth)acrylates in which the addition of amines for chain extension is avoided in order to reduce yellowing.

European patent application 12189682.3 with filing date Oct. 24, 2012, which was unpublished at the priority date of the present application, discloses radiation-curable, water-soluble or -dispersible urethane (meth)acrylates in which the stoppers used in the urethane formation are amines substituted by one or two hydrocarbyl radicals, in which the hydrocarbyl radicals together have at least 12 carbon atoms. A disadvantage is that amines of this kind are of low commercial availability and lower the target hydrophilicity of the urethane (meth)acrylate.

International applications WO 2008/098972 and WO 2010/018074 disclose aqueous dispersions of urethane (meth)acrylates and the use thereof for inkjet and printing applications.

A disadvantage of the polyurethanes described in these two documents is that their properties change after prolonged storage.

It was an object of the present invention to develop radiation-curable, water-dispersible urethane (meth)acrylates which exhibit good stability and good pigmentation properties in dispersion.

The object was achieved by radiation-curable, water-dispersible urethane (meth)acrylates (A) essentially formed from
(a) at least one (cyclo)aliphatic di- and/or polyisocyanate,
(b1) at least one (cyclo)aliphatic diol having a molar mass of less than 700 g/mol,
(b2) at least one polyester diol having a weight-average molar mass Mw of 700 to 2000 and preferably an acid number to DIN 53240 of not more than 20 mg KOH/g,
(c) at least one compound (c) having at least one isocyanate-reactive group and at least one free-radically polymerizable unsaturated group,
(d) at least one compound having at least one isocyanate-reactive group and at least one acid group,
(e) at least one base of an alkali metal for at least partial neutralization of the acid groups of component (d),
(f) optionally at least one monoalcohol having exactly one hydroxyl function, or at least one mono- and di-$C_1$-$C_4$-alkylamine,
(g) at least one monofunctional polyalkylene oxide polyether alcohol.

The inventive urethane (meth)acrylates (A) show improved storage stability and good pigmentation properties.

It is particularly advantageously possible to use the above-described urethane (meth)acrylates (A), optionally in a mixture with other radiation-curable compounds (B), as or in coating compositions and in printing inks.

Component (a) is at least one, preferably one to four, more preferably one to three, (cyclo)aliphatic di- and/or polyisocyanates.

These are monomers and/or oligomers of aliphatic or cycloaliphatic diisocyanates.

The NCO functionality of such a compound is generally at least 1.8 and may be up to 8, preferably 1.8 to 5, and more preferably 2 to 4.

The amount of isocyanate groups, calculated as NCO=42 g/mol, is generally 5% to 25% by weight.

The diisocyanates are preferably isocyanates having 4 to 20 carbon atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane, and also 3(or 4),8(or 9)-bis(isocyanatomethyl)tricyclo[$5.2.1.0^{2,6}$]decane isomer mixtures.

Mixtures of said diisocyanates may also be present.

Particular preference is given to hexamethylene diisocyanate, 1,3-bis(isocyanatomethyl)cyclohexane, isophorone diisocyanate and 4,4'- or 2,4'-di-(isocyanatocyclohexyl)methane, and very particular preference to isophorone diisocyanate and hexamethylene diisocyanate.

Isophorone diisocyanate is usually in the form of a mixture, specifically a mixture of the cis and trans isomers, generally in a proportion of about 60:40 to 80:20 (w/w), preferably in a proportion of about 70:30 to 75:25, and more preferably in a proportion of approximately 75:25.

Dicyclohexylmethane 4,4'-diisocyanate may likewise be in the form of a mixture of the different cis and trans isomers.

Cycloaliphatic isocyanates are those which comprise at least one cycloaliphatic ring system.

Aliphatic isocyanates are those which comprise exclusively linear or branched chains, in other words acyclic compounds.

Also suitable are higher isocyanates having an average of more than 2 isocyanate groups. Suitable examples of these include triisocyanates such as triisocyanatononane.

Useful polyisocyanates include polyisocyanates having isocyanurate groups, uretdione diisocyanates, polyisocyanates having biuret groups, polyisocyanates having urethane groups or allophanate groups, polyisocyanates comprising oxadiazinetrione groups, uretonimine-modified polyisocyanates, carbodiimide, hyperbranched polyisocyanates, polyurethane-polyisocyanate prepolymers or polyurea-polyisocyanate prepolymers of linear or branched $C_4$-$C_{20}$-alkylene diisocyanates and/or cycloaliphatic diisocyanates having a total of 6 to 20 carbon atoms.

The di- and polyisocyanates which can be used preferably have an isocyanate group (calculated as NCO, molecular weight=42) content of 10 to 60% by weight, based on the di- and polyisocyanate (mixture), preferably 15 to 60% by weight and more preferably 20 to 55% by weight.

Preference is given to aliphatic and/or cycloaliphatic di- and polyisocyanates, referred to collectively as (cyclo)aliphatic in the context of this specification, examples being the aliphatic and/or cycloaliphatic diisocyanates stated above, or mixtures thereof.

For the present invention it is possible to use not only those di- and polyisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI), for example, can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis is usually effected continuously in a circulation process and optionally in the presence of N-unsubstituted carbamic esters, dialkyl carbonates, and other by-products recycled from the reaction process. Di- or polyisocyanates obtained in this way generally contain a very low or even unmeasurable fraction of chlorinated compounds, leading to favorable color numbers in the products.

In one possible embodiment of the present invention, the di- and polyisocyanates (a) have a total hydrolyzable chlorine content of less than 200 ppm, preferably of less than 120 ppm, more preferably less than 80 ppm, even more preferably less than 50 ppm, in particular less than 15 ppm, and especially less than 10 ppm. This can be measured, for example, by ASTM method D4663-98. It is of course also possible to use di- and polyisocyanates (a) having a higher chlorine content.

The di- and polyisocyanates (a) may also be at least partly in blocked form.

Preference extends to

1) Polyisocyanates having isocyanurate groups and derived from aromatic, aliphatic and/or cycloaliphatic diisocyanates. Particular preference here is given to the corresponding aliphatic and/or cycloaliphatic isocyanatoisocyanurates and in particular to those based on hexamethylene diisocyanate and isophorone diisocyanate. These present isocyanurates are, in particular, tris-isocyanatoalkyl and/or tris-isocyanatocycloalkyl isocyanurates, which are cyclic trimers of the diisocyanates, or are mixtures with their higher homologs containing more than one isocyanurate ring. The isocyanatoisocyanurates generally have an NCO content of 10 to 30% by weight, in particular 15 to 25% by weight, and an average NCO functionality of 2.6 to 8.

2) Uretdione diisocyanates with aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates. The uretdione diisocyanates can be used as a sole component or in a mixture with other polyisocyanates, particularly those specified under 1).

3) Polyisocyanates having biuret groups and having aromatically, cycloaliphatically or aliphatically attached, preferably cycloaliphatically or aliphatically attached, isocyanate groups, especially tris(6-isocyanatohexyl)biuret or mixtures thereof with higher homologs thereof. These polyisocyanates having biuret groups generally have an NCO content of 18% to 22% by weight and an average NCO functionality of 2.8 to 4.5.

4) Polyisocyanates having urethane and/or allophanate groups and having aromatically, aliphatically or cycloaliphatically attached, preferably aliphatically or cycloaliphatically attached, isocyanate groups, such as may be obtained, for example, by reacting excess amounts of hexamethylene diisocyanate or of isophorone diisocyanate with mono- or polyhydric alcohols, for example methanol, ethanol, iso-propanol, n-propanol, n-butanol, iso-butanol, sec-butanol, tert-butanol, n-hexanol, n-heptanol, n-octanol, n-decanol, n-dodecanol (lauryl alcohol), 2-ethylhexanol, n-pentanol, stearyl alcohol, cetyl alcohol, lauryl alcohol, ethylene glycol monomethyl ether, ethylene glycol monoethyl ether, propane-1,3-diol monomethyl ether, cyclopentanol, cyclohexanol, cyclooctanol, cyclododecanol, trimethylolpropane, neopentyl glycol, pentaerythritol, butane-1,4-diol, hexane-1,6-diol, propane-1,3-diol, 2-ethylpropane-1,3-diol, 2-methylpropane-1,3-diol, ethylene glycol, diethylene glycol, triethylene glycol, tetraethylene glycol, pentaethylene glycol, glycerol, 1,2-dihydroxypropane, 2,2-dimethylethane-1,2-diol, butane-1,2-diol, butane-1,4-diol, 3-methylpentane-1,5-diol, 2-ethylhexane-1,3-diol, 2,4-diethyloctane-1,3-diol, hydroxypivalic acid neopentyl glycol ester, ditrimethylolpropane, dipentaerythritol, 2,2-bis(4-hydroxycyclohexyl)propane, cyclohexane-1,1-, -1,2-, -1,3- and -1,4-dimethanol, cyclohexane-1,2-, -1,3- or -1,4-diol, or mixtures thereof. These polyisocyanates having urethane and/or allophanate groups generally have an NCO content of 12 to 20% by weight and an average NCO functionality of 2.5 to 4.5.

5) Polyisocyanates comprising oxadiazinetrione groups, derived preferably from hexamethylene diisocyanate or isophorone diisocyanate. Polyisocyanates of this kind comprising oxadiazinetrione groups are obtainable from diisocyanate and carbon dioxide.

6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.

7) Uretonimine-modified polyisocyanates.

8) Carbodiimide-modified polyisocyanates.

9) Hyperbranched polyisocyanates, of the kind known for example from DE-A1 10013186 or DE-A1 10013187.

10) Polyurethane-polyisocyanate prepolymers, from di- and/or polyisocyanates with alcohols.

11) Polyurea-polyisocyanate prepolymers.

Polyisocyanates 1) to 11) may be used in a mixture, optionally also in a mixture with diisocyanates.

In one embodiment of the present invention, component (a) is a mixture of a cycloaliphatic or aliphatic, preferably of an aliphatic, monomeric diisocyanate (a1) and of a polyisocyanate (a2) based on a cycloaliphatic or aliphatic, preferably on an aliphatic, monomeric diisocyanate.

In this embodiment, component (a1) is preferably selected from the group consisting of hexamethylene diisocyanate, 1,3-bis(isocyanatomethyl)cyclohexane, isophorone diisocyanate and 4,4'- or 2,4'-di(isocyanatocyclohexyl)methane, and more preferably selected from the group consisting of isophorone diisocyanate and hexamethylene diisocyanate, and is most preferably hexamethylene 1,6-diisocyanate.

Polyisocyanate (a2) is preferably a polyisocyanate having isocyanurate groups, uretdione diisocyanate, polyisocyanate having biuret groups, polyisocyanate having urethane groups or allophanate groups, or mixtures thereof, more preferably polyisocyanate having isocyanurate groups, uretdione diisocyanate or polyisocyanates having allophanate groups, or mixtures thereof, even more preferably polyisocyanate having isocyanurate groups or polyisocyanates having allophanate groups or mixtures thereof, and in particular polyisocyanates having allophanate groups.

In one possible embodiment, the inventive urethane (meth)acrylates comprise allophanate groups, such that the content of allophanate groups in polyurethanes of this kind (calculated as $C_2N_2HO_3=101$ g/mol) is 1 to 28% by weight, preferably from 3 to 25% by weight.

In a preferred embodiment of the present invention, a component (a1) is hexamethylene 1,6-diisocyanate in diisocyanate form and/or a polyisocyanate based thereon, selected from the group consisting of isocyanurates, biurets, urethanes and allophanates, preferably from the group consisting of isocyanurates, urethanes and allophanates, more preferably from the group consisting of isocyanurates and allophanates, and the polyisocyanate based on hexamethylene 1,6-diisocyanate is most preferably a polyisocyanate comprising allophanate groups.

In a particularly preferred embodiment, in the polyisocyanate (a2) which comprises allophanate groups and is based on hexamethylene 1,6-diisocyanate, compounds (c) having exactly one isocyanate-reactive group and at least one free-radically polymerizable unsaturated group are at least partly attached via allophanate groups.

Most preferably, the polyisocyanate (a2) is a polyisocyanate which comprises at least one hydroxyalkyl (meth)acrylate attached via an allophanate group and satisfies the formula

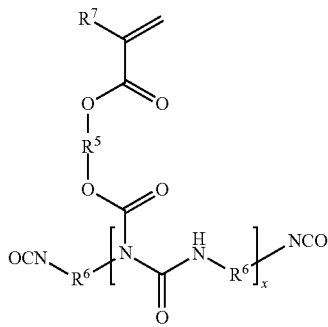

in which
$R^5$ is a divalent alkylene radical which has 2 to 12 carbon atoms and may optionally be substituted by $C_1$- to $C_4$-alkyl groups and/or be interrupted by one or more oxygen atoms, preferably having 2 to 10 carbon atoms, more preferably 2 to 8 and most preferably having 3 to 6 carbon atoms,
$R^6$ is a divalent alkylene radical or cycloalkylene radical which has 2 to 20 carbon atoms and may optionally be substituted by $C_1$- to $C_4$-alkyl groups and/or be interrupted by one or more oxygen atoms, preferably having 4 to 15 carbon atoms, more preferably having 6 to 13 carbon atoms,
$R^7$ is hydrogen or methyl, preferably hydrogen, and
x is a positive number having a statistical average of 2 up to 6, preferably of 2 to 4.

Examples of the $R^5$ radical are 1,2-ethylene, 1,2- or 1,3-propylene, 1,2-, 1,3- or 1,4-butylene, 1,1-dimethyl-1,2-ethylene, 1,2-dimethyl-1,2-ethylene, 1,5-pentylene, 1,6-hexylene, 1,8-octylene, 1,10-decylene or 1,12-dodecylene. Preference is given to 1,2-ethylene, 1,2- or 1,3-propylene, 1,4-butylene and 1,6-hexylene, particular preference to 1,2-ethylene, 1,2-propylene and 1,4-butylene, and very particular preference to 1,2-ethylene.

Preferably, $R^6$ is selected from the group consisting of 1,6-hexylene,

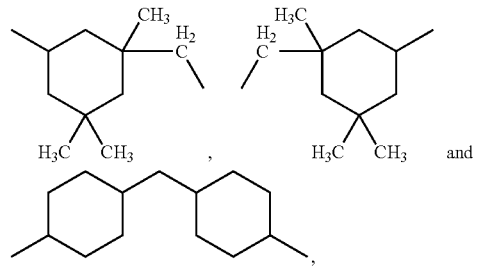

and is more preferably 1,6-hexylene.

In a particularly preferred embodiment of the present invention, $R^6$ is 1,6-hexylene and $R^5$ is selected from the group consisting of 1,2-ethylene, 1,2-propylene and 1,4-butylene, preferably from 1,2-ethylene and 1,4-butylene, and is more preferably 1,2-ethylene.

A commercially available polyisocyanate where $R^5$=1,2-ethylene, $R^6$=1,6-hexylene and $R^7$=hydrogen is available under the Laromer® LR 9000 trade name from BASF SE, Ludwigshafen, with an NCO content of 14.5-15.5% by weight.

Component (b1) is at least one, preferably one to three, more preferably one to two and most preferably exactly one (cyclo)aliphatic, especially aliphatic diol(s), having a molar mass of less than 700 g/mol, preferably less than 600, more preferably less than 500 and most preferably less than 400 g/mol.

A cycloaliphatic diol is understood to mean those diols comprising at least one saturated ring system.

Aliphatic diols are those which comprise exclusively linear or branched chains, in other words acyclic compounds.

Examples of aliphatic diols are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, heptane-1,7-diol, octane-1,8-diol, octane-1,2-diol, nonane-1,9-diol, decane-1,2-diol, decane-1,10-diol, dodecane-1,2-diol, dodecane-1,12-diol, 1,5-hexadiene-3,4-diol, neopentyl glycol, 2-butyl-2-ethylpropane-1,3-diol, 2-methylpentane-2,4-diol, 2,4-dimethylpentane-2,4-diol, 2-ethylhexane-1,3-diol, 2,5-dimethylhexane-2,5-diol, 2,2,4-trimethylpentane-1,3-diol, pinacol, diethylene glycol, triethylene glycol, dipropylene glycol, tripropylene glycol.

Diols used with preference are ethylene glycol, propane-1,2-diol, propane-1,3-diol, neopentyl glycol, 2-ethylhexane- 1,3-diol, 2-butyl-2-ethylpropane-1,3-diol, butane-1,4-diol, pentane-1,5-diol, hexane-1,6-diol and octane-1,8-diol. Particular preference is given to ethylene glycol, propane-1,2-diol, propane-1,3-diol, neopentyl glycol, 2-ethylhexane-1,3-diol and 2-butyl-2-ethylpropane-1,3-diol, very particular preference to ethylene glycol, propane-1,3-diol, neopentyl glycol and 2-butyl-2-ethylpropane-1,3-diol, and, in particular, neopentyl glycol.

Examples of cycloaliphatic diols are cyclopentane-1,2- and -1,3-diols, cyclohexane-1,2-, -1,3- and -1,4-diols, 1,1-, 1,2-, 1,3- and 1,4-bis(hydroxymethyl)cyclohexanes, 1,1-, 1,2-, 1,3- and 1,4-bis(hydroxyethyl)cyclohexanes and bis(4-hydroxycyclohexane)isopropylidene.

Preference is given to cyclohexane-1,2-, -1,3- and -1,4-diol, 1,3- and 1,4-bis(hydroxymethyl)cyclohexane and bis(4-hydroxycyclohexane)isopropylidene.

Preferred diols (b1) are ethylene glycol, propane-1,2-diol, propane-1,3-diol, 2,2-dimethylethane-1,2-diol, 2,2-dimethylpropane-1,3-diol (neopentyl glycol), butane-1,2-diol, butane-1,3-diol, butane-1,4-diol, hexane-1,6-diol or diethylene glycol.

Particularly preferred compounds (b1) are ethylene glycol, propane-1,2-diol, propane-1,3-diol, neopentyl glycol, butane-1,4-diol and diethylene glycol.

Very particularly preferred compounds (b1) are ethylene glycol, neopentyl glycol and butane-1,4-diol, especially neopentyl glycol.

Component (b2) is at least one, preferably one to three, more preferably one to two and most preferably exactly one polyester diol(s) having a weight-average molar mass Mw of 700 to 2000, preferably 750 to 1500 g/mol (determined, for example, by gel permeation chromatography (GPC)), preferably having an acid number to DIN 53240 of not more than 20 mg KOH/g.

It is preferably a polyester diol formed at least partly from cycloaliphatic diol and/or dicarboxylic acid units, more preferably at least partly from cycloaliphatic diol units, and most preferably comprises, as well as any desired dicarboxylic acid units, exclusively cycloaliphatic diols as diol units.

Polyester diols of this kind have elevated stiffness compared to those formed from purely aliphatic units. In addition, aliphatic and cycloaliphatic units have a lesser tendency to yellowing compared to purely aromatic units.

The dicarboxylic acid units may be the free acids or derivatives thereof.

Derivatives are preferably understood to mean
the corresponding anhydrides in monomeric or else polymeric form,
mono- or dialkyl esters, preferably mono- or di-$C_1$-$C_4$-alkyl esters, more preferably mono- or dimethyl esters or the corresponding mono- or diethyl esters,
or else mono- and divinyl esters, and also
mixed esters, preferably mixed esters with different $C_1$-$C_4$-alkyl components, more preferably mixed methyl ethyl esters.

In the context of this document, $C_1$-$C_4$-alkyl means methyl, ethyl, iso-propyl, n-propyl, n-butyl, iso-butyl, sec-butyl and tert-butyl, preferably methyl, ethyl and n-butyl, more preferably methyl and ethyl and most preferably methyl.

Aliphatic units have only open chains, preferably alkylene chains, whereas cycloaliphatic units have at least one ring system outside the functional groups. Aromatic units have at least one aromatic ring system outside the functional groups.

Examples of aliphatic diols are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, heptane-1,7-diol, octane-1,8-diol, octane-1,2-diol, nonane-1,9-diol, decane-1,2-diol, decane-1,10-diol, dodecane-1,2-diol, dodecane-1,12-diol, 1,5-hexadiene-3,4-diol, neopentyl glycol, 2-methylpentane-2,4-diol, 2,4-dimethylpentane-2,4-diol, 2-ethylhexane-1,3-diol, 2,5-dimethylhexane-2,5-diol, 2,2,4-trimethylpentane-1,3-diol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H, where n is an integer and n≥4, polyethylene-polypropylene glycols, where the sequence of the ethylene oxide of the propylene oxide units may be blockwise or random, polytetramethylene glycols, polypropane-1,3-diols.

Diols used with preference are ethylene glycol, propane-1,2-diol, propane-1,3-diol, butane-1,4-diol, pentane-1,5-diol, hexane-1,6-diol and octane-1,8-diol.

Examples of cycloaliphatic diols are cyclopentane-1,2- and -1,3-diols, cyclohexane-1,2-, -1,3- and -1,4-diols, 1,1-, 1,2-, 1,3- and 1,4-bis(hydroxymethyl)cyclohexanes, 1,1-, 1,2-, 1,3- and 1,4-bis(hydroxyethyl)cyclohexanes and bis(4-hydroxycyclohexane)isopropylidene.

Preference is given to cyclohexane-1,2-, -1,3- and -1,4-diol, 1,3- and 1,4-bis(hydroxymethyl)cyclohexane and bis(4-hydroxycyclohexane)isopropylidene.

Examples of aliphatic dicarboxylic acids are oxalic acid, malonic acid, maleic acid, fumaric acid, succinic acid, glutaric acid, adipic acid, pimelic acid, suberic acid, azelaic acid, sebacic acid, undecane-α,ω-dicarboxylic acid, dodecane-α,ω-dicarboxylic acid and derivatives thereof.

Examples of cycloaliphatic dicarboxylic acids are cis- and trans-cyclohexane-1,2-dicarboxylic acid (hexahydrophthalic acids), cis- and trans-cyclohexane-1,3-dicarboxylic acid, cis- and trans-cyclohexane-1,4-dicarboxylic acid, 1,2-, 1,3- or 1,4-cyclohex-4-enedicarboxylic acid (tetrahydrophthalic acids), cis- and trans-cyclopentane-1,2-dicarboxylic acid, cis- and trans-cyclopentane-1,3-dicarboxylic acid and derivatives thereof.

Examples of aromatic dicarboxylic acids are phthalic acid, isophthalic acid, terephthalic acid and phthalic anhydride, preference being given to phthalic acid and isophthalic acid, particular preference to phthalic acid.

Component (c) is at least one, preferably 1 to 3, more preferably exactly one to two and most preferably exactly one compound(s) having at least one, for example one to three, preferably one to two and more preferably exactly one isocyanate-reactive group(s) and at least one, for example one to five, preferably one to three, more preferably one or two and most preferably exactly one free-radically polymerizable unsaturated group.

Isocyanate-reactive groups may, for example, be —OH, —SH, —$NH_2$ and —$NHR^8$ where $R^8$ is hydrogen or an alkyl group comprising 1 to 4 carbon atoms, for example methyl, ethyl, n-propyl, iso-propyl, n-butyl, iso-butyl, sec-butyl or tert-butyl.

Isocyanate-reactive groups may preferably be —OH, —$NH_2$ or —$NHR^8$, more preferably —OH or —$NH_2$ and most preferably —OH.

Examples of possible components (c) include monoesters of α,β-unsaturated carboxylic acids, such as acrylic acid, methacrylic acid, crotonic acid, itaconic acid, fumaric acid, maleic acid, acrylamidoglycolic acid, methacrylamidoglycolic acid or vinyl ethers with diols or polyols, having preferably 2 to 20 carbon atoms and at least two hydroxyl groups, such as ethylene glycol, diethylene glycol, triethylene glycol, 1,2-propylene glycol, 1,3-propylene glycol, 1,1-dimethylethane-1,2-diol, dipropylene glycol, triethylene glycol, tetraethylene glycol, pentaethylene glycol, tripropylene glycol, butane-1,2-, -1,3- or -1,4-diol, pentane-1,5-diol, neopentyl glycol, hexane-1,6-diol, 2-methylpentane-1,5-diol, 2-ethylbutane-1,4-diol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, polyTHF having a molar weight between 162 and 2000, polypropane-1,3-diol having a molar weight between 134 and 400 or polyethylene glycol having a molar weight between 238 and 458. In addition, it is also possible to use esters or amides of (meth)acrylic acid with amino alcohols, examples being 2-aminoethanol, 2-(methylamino)ethanol, 3-amino-1-propanol, 1-amino-2-propanol or 2-(2-aminoethoxy)ethanol, 2-mercaptoethanol or polyaminoalkanes, such as ethylenediamine or diethylenetriamine, or vinylacetic acid.

In addition, unsaturated polyetherols or polyesterols or polyacrylate polyols having an average OH functionality of 2 to 10 are also suitable, albeit less preferably.

Examples of amides of ethylenically unsaturated carboxylic acids with amino alcohols are hydroxyalkyl(meth)acrylamides such as N-hydroxymethylacrylamide, N-hydroxymethylmethacrylamide, N-hydroxyethylacrylamide, N-hydroxyethylmethacrylamide, 5-hydroxy-3-oxapentyl (meth)acrylamide, N-hydroxyalkylcrotonamides such as N-hydroxymethylcrotonamide, or N-hydroxyalkylmaleimides such as N-hydroxyethylmaleimide.

Preference is given to using 2-hydroxyethyl (meth)acrylate, 2- or 3-hydroxypropyl (meth)acrylate, 1,4-butanediol mono(meth)acrylate, neopentyl glycol mono(meth)acrylate, 1,5-pentanediol mono(meth)acrylate, 1,6-hexanediol mono (meth)acrylate, glycerol mono(meth)acrylate and di(meth)acrylate, trimethylolpropane mono(meth)acrylate and di(meth)acrylate, pentaerythritol mono(meth)acrylate, di(meth)acrylate, and tri(meth)acrylate, and also 4-hydroxybutyl vinyl ether, 2-aminoethyl (meth)acrylate, 2-aminopropyl (meth)acrylate, 3-aminopropyl (meth)acrylate, 4-aminobutyl (meth)acrylate, 6-aminohexyl (meth)acrylate, 2-thioethyl (meth)acrylate, 2-aminoethyl(meth)acrylamide, 2-aminopropyl(meth)acrylamide, 3-aminopropyl(meth)acrylamide, 2-hydroxyethyl(meth)acrylamide, 2-hydroxypropyl(meth)acrylamide or 3-hydroxypropyl(meth)acrylamide. Particular preference is given to 2-hydroxyethyl acrylate, 2-hydroxyethyl methacrylate, 2- or 3-hydroxypropyl acrylate, butane-1,4-diol monoacrylate, 3-(acryloyloxy)-2-hydroxypropyl (meth)acrylate, and the monoacrylates of polyethylene glycol with a molar mass of 106 to 238.

In a preferred embodiment, component (c) is selected from the group consisting of 2-hydroxyethyl acrylate, 2-hydroxyethyl methacrylate, 2- or 3-hydroxypropyl acrylate and butane-1,4-diol monoacrylate, 1,2- or 1,3-diacrylate of glycerol, trimethylolpropane diacrylate, pentaerythrityl triacrylate, ditrimethylolpropane triacrylate and dipentaerythrityl pentaacrylate, preferably from 2-hydroxyethyl acrylate and 2-hydroxyethyl methacrylate, and is more preferably 2-hydroxyethyl acrylate.

In a preferred embodiment, at least a portion of compound (c) is attached to the di- or polyisocyanate (a), preferably a polyisocyanate (a2), more preferably via allophanate groups. In this case, the molar ratio of compound (c) attached to a polyisocyanate (a2) to compound (c) which is used in free form in the preparation of the inventive urethane (meth)acrylate is, for example, from 90:10 to 10:90, preferably from 20:80 to 80:20 and more preferably 30:70 to 70:30. It is preferable that the compound (c) attached to a polyisocyanate (a2) and the compound (c) which is used in free form in the preparation of the inventive urethane (meth)acrylate are the same compound (c), but they may also be different compounds (c).

If component (c) comprises technical mixtures from the acylation of trimethylolpropane, pentaerythritol, ditrimethylolpropane or dipentaerythritol, these are usually used in the form of mixtures of completely and incompletely acylated polyols. In that case, very particular preference is given as compounds (c) to technical mixtures from the acylation of pentaerythritol which usually have an OH number to DIN 53240 of 99 to 115 mg KOH/g and are composed predominantly of pentaerythrityl triacrylate and pentaerythrityl tetraacrylate, and may also comprise minor amounts of pentaerythrityl diacrylate.

Component (d) is at least one, preferably exactly one, compound having at least one, for example one or two, preferably exactly two, isocyanate-reactive group(s) and at least one acid group.

Acid groups are understood to mean carboxylic acid, sulfonic acid or phosphonic acid groups, preferably carboxylic acid or sulfonic acid groups and more preferably carboxylic acid groups.

Possible, albeit less preferred, compounds (d) comprise exactly one isocyanate-reactive group, and at least one hydrophilic group which is anionic or can be converted to an anionic group. Examples of the compounds in question are those as described in EP-A1 703 255, particularly from page 3 line 54 to page 4 line 38 therein, in DE A1 197 24 199, particularly from page 3 line 4 to line 30 therein, in DE A1 40 10 783, particularly from column 3 line 3 to line 40 therein, in DE A1 41 13 160, particularly from column 3 line 63 to column 4 line 4 therein, and in EP-A2 548 669, particularly from page 4 line 50 to page 5 line 6 therein. These documents are hereby expressly incorporated by reference as part of the present disclosure content.

Possible compounds (d) are those having the general formula

$$RG-R^3-DG$$

in which
RG is at least one isocyanate-reactive group,
DG is at least one dispersive group and
$R^3$ is an aliphatic, cycloaliphatic or aromatic radical comprising 1 to 20 carbon atoms.

Examples of isocyanate-reactive groups RG are —OH, —SH, —NH$_2$ or —NHR$^8$ in which R$^8$ is as defined above but may be different than the radical used therein, preferably —OH, —NH$_2$ or —NHR$^8$, more preferably —OH or —NH$_2$, and most preferably —OH.

Examples of DG are —COOH, —SO$_3$H or —PO$_3$H and the anionic forms thereof, which may be associated in accordance with the invention with any alkali metal ion as a counterion, for example Li$^+$, Na$^+$, K$^+$ or Cs$^+$.

$R^3$ is preferably methylene, 1,2-ethylene, 1,2-propylene, 1,3-propylene, 1,2-butylene, 1,4-butylene, 1,3-butylene, 1,6-hexylene, 1,8-octylene, 1,12-dodecylene, 1,2 phenylene, 1,3-phenylene, 1,4-phenylene, 1,2-naphthylene, 1,3-naphthylene, 1,4 naphthylene, 1,6-naphthylene, 1,2-cyclopentylene, 1,3-cyclopentylene, 1,2-cyclo-hexylene, 1,3-cyclohexylene or 1,4-cyclohexylene.

Components (d) of this kind are preferably, for example, hydroxyacetic acid, tartaric acid, lactic acid, 3-hydroxypropionic acid, hydroxypivalic acid, mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxysuccinic acid, hydroxydecanoic acid, ethylenediaminetriacetic acid, hydroxydodecanoic acid, hydroxyhexadecanoic acid, 12-hydroxystearic acid, aminonaphthalenecarboxylic acid, hydroxyethanesulfonic acid, hydroxypropanesulfonic acid, mercaptoethanesulfonic acid, mercaptopropanesulfonic acid, aminomethanesulfonic acid, taurine, aminopropanesulfonic acid, N-alkylated or N-cycloalkylated aminopropanesulfonic or aminoethanesulfonic acids, examples being N-cyclohexylaminoethanesulfonic acid or N-cyclohexylaminopropanesulfonic acid, and also their alkali metal, alkaline earth metal or ammonium salts, and with particular preference the stated monohydroxycarboxylic and monohydroxysulfonic acids, and also monoaminocarboxylic and monoaminosulfonic acids.

For production of the dispersion, the aforementioned acids, if they are not already salts, are partly or fully neutralized with a base of an alkali metal.

Compound (d) is preferably a compound having exactly two hydroxyl groups and exactly one acid group, preferably exactly one carboxylic acid group.

Examples thereof are dimethylolpropionic acid, dimethylolbutyric acid and dimethylolpentanoic acid, preferably dimethylolpropionic acid and dimethylolbutyric acid, a particularly preferred compound (d) being dimethylolpropionic acid.

Component (e) is at least one base of an alkali metal for at least partial neutralization of the acid groups of component (d).

Useful basic compounds (e) include alkali metal hydroxides, oxides, carbonates and hydrogencarbonates. Particular preference is given to at least partial, preferably full, neutralization with sodium hydroxide or potassium hydroxide. The amounts of chemically attached acid groups introduced and the extent of the neutralization of the acid groups (which is usually 40 to 100 mol %, preferably 50 to 100 mol %, more preferably 60 to 100, even more preferably 75 to 100 and especially 90 to 100 mol % based on equivalents) should preferably be sufficient to ensure dispersion of the polyurethanes in an aqueous medium, which is familiar to the person skilled in the art.

Preferably, 50 to 100 mol % of the acid groups from (d) are neutralized. This brings about a monomodal particle size distribution of the dispersed particles and increases the stability of the dispersion.

The optional component (f) is at least one nucleophilic alcohol or amine, preferably monoalcohol or monoamine, which may serve as a stopper for any free isocyanate groups still present in the urethane (meth)acrylate.

Preferred monoalcohols are alkanols having 1 to 20, preferably 1 to 12, more preferably 1 to 6, even more preferably 1 to 4 and especially 1 to 2 carbon atoms.

Examples thereof are methanol, ethanol, iso-propanol, n-propanol, n-butanol, iso-butanol, sec-butanol, tert-butanol, n-hexanol, n-heptanol, n-octanol, n-decanol, n-dodecanol (lauryl alcohol), 2-ethylhexanol, cyclopentanol, cyclohexanol, cyclooctanol, cyclododecanol, ethylene glycol monomethyl ether, ethylene glycol monoethyl ether, diethylene glycol, 1,3-propanediol monomethyl ether, preferably methanol, ethanol, iso-propanol, n-propanol, n-butanol, tert-butanol, n-hexanol, 2-ethylhexanol, cyclopentanol, cyclohexanol, and cyclododecanol, more preferably methanol, ethanol, iso-propanol, n-propanol, n-butanol and tert-butanol, even more preferably methanol and ethanol, and especially methanol.

In a preferred embodiment, the monools may be the stated cycloaliphatic alcohols, preferably cyclopentanol or cyclohexanol, more preferably cyclohexanol.

In a further preferred embodiment, the monools may be the stated aliphatic alcohols having 6 to 20 carbon atoms, more preferably those having 8 to 20 carbon atoms, most preferably those having 10 to 20 carbon atoms.

In a particularly preferred embodiment, the monools are the stated aliphatic alcohols, more preferably those having 1 to 4 carbon atoms, especially methanol.

Preferred stoppers (f) are, in contrast, mono- and di-$C_1$-$C_4$-alkylamines and more preferably mono- or dialkanolamines. Examples thereof are especially diethylamine, di-n-butylamine, ethanolamine, propanolamine, N,N-dipropanolamine and N,N-diethanolamine.

Mono- and dialkylamines having longer alkyl groups than $C_1$-$C_4$-alkyl groups are excluded from the invention, since these lower the hydrophilicity of the urethane (meth)acrylates.

Likewise ruled out are diamines and polyfunctional amines, since these act as chain extenders and increase the molecular weight of the urethane (meth)acrylate, which makes dispersibility or solubility more difficult.

It is possible to use up to 10% by weight of stopper (f), based on polyurethane (A) to be synthesized.

The function of the compounds (f) is to satisfy any unconverted isocyanate groups remaining in the course of preparation of the urethane (meth)acrylates (A).

The obligatory compound (g) is at least one monofunctional polyalkylene oxide polyether alcohol, as obtainable by alkoxylation of suitable starter molecules.

Suitable starter molecules for preparation of such polyalkylene oxide polyether alcohols are thiol compounds, monohydroxyl compounds of the general formula $$R^{18}-O-H$$

or secondary monoamines of the general formula $$R^{16}R^{17}N-H$$

in which $R^{16}$, $R^{17}$ and $R^{18}$ are each independently $C_1$-$C_{18}$-alkyl, $C_2$-$C_{18}$-alkyl optionally interrupted by one or more oxygen and/or sulfur atoms and/or one or more substituted or unsubstituted imino groups, $C_6$-$C_{12}$-aryl, $C_5$-$C_{12}$-cycloalkyl or a five- to six-membered heterocycle having oxygen, nitrogen and/or sulfur atoms, or $R^{16}$ and $R^{17}$ together form an unsaturated, saturated or aromatic ring optionally interrupted by one or more oxygen and/or sulfur atoms and/or one or more substituted or unsubstituted imino groups, where the radicals mentioned may each be substituted by functional groups, aryl, alkyl, aryloxy, alkyloxy, halogen, heteroatoms and/or heterocycles.

Preferably, $R^{16}$, $R^{17}$ and $R^{18}$ are each independently $C_1$- to $C_4$-alkyl; more preferably, $R^{16}$, $R^{17}$ and $R^{18}$ are each methyl.

For example, suitable monofunctional starter molecules may be saturated monoalcohols, i.e. those having no C—C or C-heteroatom double or triple bonds, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, cyclopentanol, the isomeric methylcyclohexanols or hydroxymethylcyclohexane, 3-ethyl-3-hydroxymethyloxetane, or tetrahydrofurfuryl alcohol; aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, di-n-butylamine, diisobutylamine, bis(2-ethylhexyl)amine, N-methyl- and N-ethylcyclohexylamine or dicyclohexylamine, heterocyclic secondary amines such as morpholine, pyrrolidine, piperidine or 1H-pyrazole, and amino alcohols such as 2-dimethylaminoethanol, 2-diethylaminoethanol, 2-diisopropylaminoethanol, 2-dibutylaminoethanol, 3-(dimethylamino)-1-propanol or 1-(dimethylamino)-2-propanol.

Preferred starter molecules are alcohols having not more than 6 carbon atoms, more preferably not more than 4 carbon atoms, most preferably not more than 2 carbon atoms, and especially methanol.

Alkylene oxides suitable for the alkoxylation reaction are ethylene oxide, propylene oxide, iso-butylene oxide, vinyloxirane and/or styrene oxide, which can be used in any order (for the preparation of block copolymers) or else in a mixture (for the preparation of random copolymers) in the alkoxylation reaction.

Preferred alkylene oxides are ethylene oxide, propylene oxide, and mixtures thereof, particular preference being given to ethylene oxide.

Preferred polyether alcohols are those based on polyalkylene oxide polyether alcohols prepared using saturated aliphatic or cycloaliphatic alcohols of the kind specified above as starter molecules. Very particular preference is given to those based on polyalkylene oxide polyether alcohols prepared using saturated aliphatic alcohols having 1 to 4 carbon atoms in the alkyl radical. Especially preferred polyalkylene oxide polyether alcohols are those prepared starting from methanol.

The monohydric polyalkylene oxide polyether alcohols contain an average of generally at least 2 alkylene oxide units, preferably 5 ethylene oxide units, per molecule, in copolymerized form, more preferably at least 7 and most preferably at least 10.

The monohydric polyalkylene oxide polyether alcohols contain an average of generally up to 90 alkylene oxide units, preferably ethylene oxide units, per molecule, in copolymerized form, preferably up to 45, more preferably up to 40 and most preferably up to 30.

The molar mass of the monohydric polyalkylene oxide polyether alcohols is preferably up to 4000, more preferably not more than 2000 g/mol, most preferably not less than 500, in particular 1000±500 g/mol and especially 500 to 1000 g/mol.

Preferred polyether alcohols are thus compounds of the formula

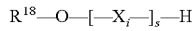

$R^{18}$—O—[—$X_i$—]$_s$—H in which
$R^{18}$ is as defined above,
s is an integer from 2 to 90, preferably 5 to 45, more preferably 7 to 40 and most preferably 10 to 30 and
every $X_i$ for i=1 to s may be selected independently from the group consisting of —$CH_2$—$CH_2$—O—, —$CH_2$—CH($CH_3$)—O—, —CH($CH_3$)—$CH_2$—O—, —$CH_2$—C($CH_3$)$_2$—O—, —C($CH_3$)$_2$—$CH_2$—O—, —$CH_2$—CHVin-O—, —CHVin-$CH_2$—O—, —$CH_2$—CHPh-O— and —CHPh-$CH_2$—O—, preferably from the group of —$CH_2$—$CH_2$—O—, —$CH_2$—CH($CH_3$)—O— and —CH($CH_3$)—$CH_2$—O—, and more preferably —$CH_2$—$CH_2$—O—, in which Ph is phenyl and Vin is vinyl.

The composition of the urethane (meth)acrylates (A) is generally as follows:
(a) 100 mol % of isocyanate functions in the sum total of (a1) and (a2),
(b) 5 to 35 mol % of hydroxyl functions in the sum total of (b1) and (b2) (based on isocyanate functions in (a)), preferably 15 to 35 mol %,
(c) 20 to 80 mol % of hydroxyl functions (based on isocyanate functions in (a)), preferably 30 to 70 mol %,
(d) 20 to 60 mol % of hydroxyl functions (based on isocyanate functions in (a)), preferably 25 to 50 mol %,
(e) 60 to 100 mol % of base (based on acid functions in (d)), preferably 80 to 100 mol %,
(f) 0 to 30 mol %, preferably 5 to 30 mol %, more preferably 10 to 25 mol %, of hydroxyl or amino functions which react with isocyanate (based on isocyanate functions in (a)),
(g) 0.5 to 10 mol %, preferably 1 to 5 mol %, of hydroxyl functions (based on isocyanate functions in (a)),
with the proviso that the sum total of the isocyanate-reactive groups in components (b), (c), (d), and (g) is 70 to 100 mol % of isocyanate-reactive groups, preferably 75 to 100 mol % and more preferably 80 to 100 mol % (based on isocyanate functions in (a)). The reaction is of components (b), (c), (d), and (g) can preferably be stopped by addition of component (f) at a conversion of isocyanate groups of 60 to 100%, more preferably at 70 to 100% and most preferably at 75 to 100%.

When the isocyanate groups of component (a) are in the form of two different components (a1) and (a2), the ratio of (a1) to (a2) (based on the amount of the isocyanate groups present therein) is from 4:1 to 1:4, preferably from 2:1 to 1:4, more preferably from 1:1 to 1:4 and most preferably from 1:3 to 1:4.

Otherwise, the figures for the sum total of components (a1) and (a2) are of course based only on the one component (a).

It may be advisable to use component (a) comprising isocyanate groups, i.e. the sum total of components (a1) and (a2), in excess, for example up to 140 mol %, with respect to OH-functional groups, preferably up to 130 mol % and more preferably up to 125 mol %. This is especially preferred when at least one of the components used, especially the hygroscopic compound (b), comprises water, which reacts with isocyanate functions in competition with hydroxyl functions.

The molecular weight $M_w$ of the polyurethanes (A) may, for example, be 1000 to a maximum of 50 000 g/mol, preferably 3000 to 30 000 g/mol, more preferably 5000 to 25 000 g/mol and most preferably at least 5000 g/mol, determined, for example, by means of gel permeation chromatography (GPC).

In one embodiment of the present invention, polyurethane (A) has a glass transition temperature, determinable, for example, by differential thermoanalysis (DSC), of not more than 50° C., preferably not more than 40° C., determined to ASTM 3418/82 at a heating rate of 10° C./min.

In a preferred embodiment of the present invention, polyurethane (A) does not comprise any free NCO groups.

According to the invention, the urethane (meth)acrylate (A) is prepared from components (a) to (g) by initially charging at least components (b) and (c) and optionally (d) at least in part, preferably in full, and adding the isocyanate (a) to this mixture of the initially charged components.

For this purpose, preferably at least half of the planned use amount of component (b) is initially charged, preferably at least 65%, more preferably at least 75% and especially the full amount.

In addition, preferably at least half of the planned use amount of component (c) is initially charged, preferably at least 65%, more preferably at least 75% and especially the full amount.

Preferably at least half of the planned use amount of component (d) is initially charged, preferably at least 65%, more preferably at least 75% and especially the full amount.

The isocyanate (a) is then added to this mixture of components (b) and (c) and optionally (d). This can be done continuously, in two or more portions, or in one addition.

Components (a1) and (a2) are preferably added simultaneously at least in part, preferably in full, in order to avoid domains having an elevated proportion of (a1) or (a2) in the polyurethane (A) which forms.

The reaction mixture is then reacted at temperatures of 25 to 100° C., preferably 40 to 90° C., over a period of 3 to 20 hours, preferably of 4 to 12 hours, with stirring or pumped circulation.

During the reaction, the temperature may stay the same or be increased continuously or stepwise.

In general, component (f) is added when the components present in the reaction mixture have essentially reacted, for example have reacted to an extent of at least 50%, preferably to an extent of at least 75%.

The reaction is accelerated by addition of a suitable catalyst. Such catalysts are known from the literature, for example from G. Oertel (ed.), Polyurethane [Polyurethanes], 3rd edition 1993, Carl Hanser Verlag, Munich—Vienna, pages 104 to 110, chapter 3.4.1. "Katalysatoren" [Catalysts], preferably organic amines, especially tertiary aliphatic, cycloaliphatic or aromatic amines, Brønsted acids and/or Lewis-acidic organometallic compounds, more preferably Lewis-acidic organometallic compounds. These are preferably Lewis-acidic organic metal compounds for which tin compounds, for example, are an option, for example tin(II) salts of organic carboxylic acids, e.g. tin(II) diacetate, tin(II) dioctoate, tin(II) bis(ethylhexanoate) and tin(II) dilaurate, and the dialkyltin(IV) salts of organic carboxylic acids, e.g. dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate. In addition, it is possible to use zinc(II) salts, for example zinc(II) dioctoate.

Metal complexes, such as acetylacetonates of iron, titanium, aluminum, zirconium, manganese, nickel, zinc and cobalt, are also possible.

Further metal catalysts are described by Blank et al. in Progress in Organic Coatings, 1999, vol. 35, pages 19-29.

Tin- and zinc-free alternatives used include compounds of zirconium, of bismuth, of titanium and of aluminum. These are, for example, zirconium tetraacetylacetonate (e.g. K-KAT® 4205 from King Industries); zirconium dionates (e.g. K-KAT® XC-9213; XC-A 209 and XC-6212 from King Industries); aluminum dionate (e.g. K-KAT® 5218 from King Industries).

Useful zinc and bismuth compounds include those in which the following anions are used: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and $(C_{n+1}H_{2n-2}O_4)^{2-}$, where n represents the numbers 1 to 20. Preference is given to the carboxylates in which the anion obeys the formulae $(C_nH_{2n-1}O_2)^-$ and $(C_{n+1}H_{2n-2}O_4)^{2-}$ where n is 1 to 20. Particularly preferred salts have, as anions, monocarboxylates of the general formula $(C_nH_{2n-1}O_2)^-$ where n represents the numbers 1 to 20. Particular mention should be made here of formate, acetate, propionate, hexanoate, neodecanoate and 2-ethylhexanoate.

Among the zinc catalysts, preference is given to the zinc carboxylates, particular preference to those of carboxylates having at least six carbon atoms, most preferably at least eight carbon atoms, especially zinc(II) diacetate or zinc(II) dioctoate or zinc(II) neodecanoate. Commercially available catalysts are, for example, Borchi® Kat 22 from OMG Borchers GmbH, Langenfeld, Germany.

Among the bismuth catalysts, preference is given to the bismuth carboxylates, particular preference to those of carboxylates having at least six carbon atoms, especially bismuth octoates, ethylhexanoates, neodecanoates or pivalates; for example K-KAT 348, XC-B221; XC-C227, XC 8203 and XK-601 from King Industries, TIB KAT 716, 716LA, 716XLA, 718, 720, 789 from TIB Chemicals and those from Shepherd Lausanne, and also, for example, Borchi® Kat 24; 315; 320 from OMG Borchers GmbH, Langenfeld, Germany.

Mixtures of different metals may be involved, as, for example, in Borchi® Kat 0245 from OMG Borchers GmbH, Langenfeld, Germany.

Among the titanium compounds, preference is given to the titanium tetraalkoxides $Ti(OR)_4$, particular preference to those of alcohols ROH having 1 to 8 carbon atoms, for example methanol, ethanol, iso-propanol, n-propanol, n-butanol, iso-butanol, sec-butanol, tert-butanol, n-hexanol, n-heptanol, n-octanol, preferably methanol, ethanol, isopropanol, n-propanol, n-butanol, tert-butanol, more preferably isopropanol and n-butanol.

These catalysts are suitable for solvent-based, water-based and/or blocked systems.

Molybdenum catalysts, tungsten catalysts and vanadium catalysts are described especially for the conversion of blocked polyisocyanates in WO 2004/076519 and WO 2004/076520.

Preferred Lewis-acidic organic metal compounds are dimethyltin diacetate, dibutyltin dibutyrate, dibutyltin bis(2-ethylhexanoate), dibutyltin dilaurate, dioctyltin dilaurate, zinc(II) dioctoate, zirconium acetylacetonate, zirconium 2,2,6,6-tetramethyl-3,5-heptanedionate and bismuth 2-ethylhexanoate.

Particular preference is given, however, to dibutyltin dilaurate, bismuth neodecanoate and bismuth 2-ethylhexanoate, very particular preference to bismuth neodecanoate and bismuth 2-ethylhexanoate.

It is possible to additionally increase the activity of the catalysts through presence of acids, for example through acids having a pKa of <2.5, as described in EP 2316867 A1, or having a pKa between 2.8 and 4.5, as described in WO 04/029121 A1. Preference is given to the use of acids having a pKa of not more than 4.8, more preferably of not more than 2.5.

It is preferable in accordance with the invention to conduct the reaction without catalyst, but the reaction mixture in this case has to be subjected to higher temperatures and/or longer reaction times.

In order to avoid unwanted polymerization of the (meth) acrylate groups during the reaction, polymerization inhibitors can be added. Inhibitors of this kind are described, for example, in WO 03/035596, page 5 line 35 to page 10 line 4, which is hereby incorporated by reference into the present disclosure content.

A preferred embodiment of the present invention may involve using incorporable polymerization inhibitors, i.e. those having an —OH or —$NH_2$ group, i.e. an isocyanate-reactive group. A preferred example of these is 4-hydroxy-2,2,6,6-tetramethylpiperidine N-oxyl.

The reaction can be regarded as having ended when the NCO value has reached the theoretical conversion value to an extent of at least 95%, preferably to an extent of at least 97% and more preferably to an extent of at least 98%.

If unconverted isocyanate groups should still be present, the reaction can be completed under the above reaction conditions by reaction with the stopper (f).

After the preparation, the reaction mixture is dispersed or diluted in water.

On completion of reaction of di- or polyisocyanate (a) with the components having isocyanate-reactive groups, it is possible to remove any organic solvent used, for example by distillation.

This usually establishes a solids content of 35 to 45%, but the latter may also be up to 60%.

The mean particle size in the dispersion is generally 10 to 150 nm, preferably 15 to 120 nm, more preferably 20 to 100 nm, most preferably 20 to 90 nm.

In the case of a pigment dispersion, the preparation of polyurethane (A) is followed by addition of one or more pigments and optionally water. Preference is given to establishing a solids content in the range from 10 to 80%, preferably to 65%, more preferably 40 to 60%.

The weight ratio of polyurethane (A) to pigment may vary within wide limits. In one embodiment of the present invention, the weight ratio of polyurethane (A) to pigment is within a range from 5:1 to 1:10, preferably 3:1 to 1:8, more preferably 1:1 to 1:6.

Subsequently, polyurethane (A) and pigment are dispersed. The dispersion can be conducted in any apparatus suitable for dispersion. Examples include shaker apparatuses, for example from Skandex. Preferably, polyurethane (A) and pigment are dispersed, for example, in ultrasonic apparatuses, high pressure homogenizers, 2-, 3-, 4- or 5-roll mills, minimills, Henschel mixers, shaking mills, Ang mills, gear mills, bead mills, wet mills, sand mills, attritors, colloid mills, ultrasonic homogenizers, with Ultra-Turrax stirrers, and in particular by grinding, for example in 2-, 3-, 4- or 5-roll mills, minimills, shaking mills, Ang mills, gear mills, bead mills, wet mills, sand mills, colloid mills, ball mills, specifically stirred ball mills.

A suitable duration for the dispersion has been found to be, for example, 10 minutes to 48 hours, although a longer period is also conceivable. A preferred duration for the dispersion is from 15 minutes to 24 hours.

Pressure and temperature conditions in the dispersing operation are generally uncritical; for example standard pressure has been found to be suitable. Suitable temperatures have been found to be, for example, temperatures in the range from 10° C. to 100° C., preferably to 80° C.

The dispersion of the pigment affords pigmented aqueous dispersions. In one embodiment of the present invention, inventive aqueous dispersions have a solids content in the range from 10 to 80%, preferably to 65%, more preferably 40 to 60%.

During the performance of the dispersing operation, it is possible to add customary grinding aids.

For formulation of radiation-curable coating compositions or printing inks, it is conceivable and preferable to mix the urethane (meth)acrylate (A) with at least one other, preferably low molecular weight (meth)acrylate (B) which is different than (A). This (meth)acrylate (B) preferably comprises those (meth)acrylates which are soluble or dispersible in an aqueous dispersion of the urethane (meth)acrylate (A).

Low molecular weight (meth)acrylates (B) preferably have at least two, preferably at least three, more preferably three to four, (meth)acrylate functions, and a mean molecular weight up to 1000 g/mol, preferably up to 750 g/mol.

In a preferred embodiment, the low molecular weight (meth)acrylates (B) may be reaction products of (cyclo) aliphatic, more preferably aliphatic, glycidyl ethers with (meth)acrylic acid.

Useful examples are glycidyl ethers of aliphatic polyols. A large number of products of this kind are supplied commercially. Particular preference is given to polyglycidyl compounds of the fully hydrogenated bisphenol A, F or B type, and most preferably glycidyl ethers of polyhydric alcohols, for example of butane-1,4-diol, cyclohexane-1,4-dimethanol, neopentyl glycol, hexane-1,6-diol, glycerol, trimethylolpropane and pentaerythritol.

Especially preferred is the reaction product of acrylic acid with butane-1,4-diol diglycidyl ether.

In a further preferred embodiment, the compounds (B) are multifunctional (meth)acrylates, preferably acrylates of alkoxylated, preferably propoxylated and/or ethoxylated, more preferably ethoxylated, multifunctional alcohols.

Examples of these are (meth)acrylates, preferably acrylates of compounds of the formulae (VIIIa) to (VIIId)

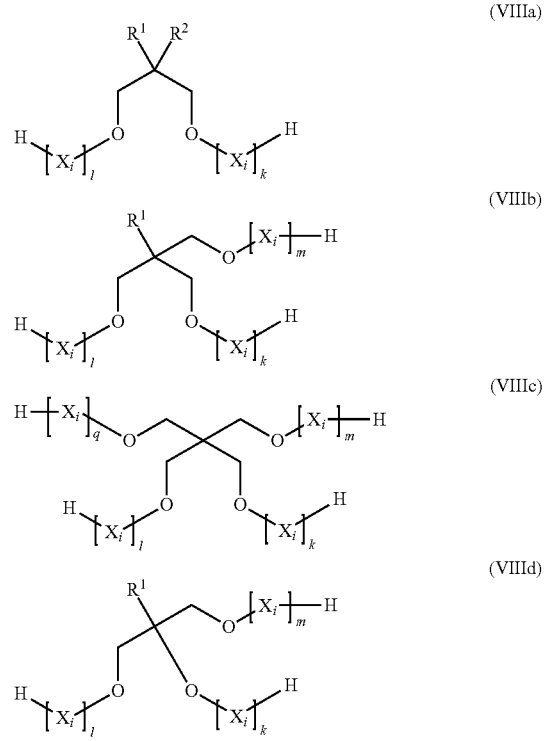

in which $R^1$ and $R^2$ are each independently hydrogen or $C_1$-$C_{10}$-alkyl, preferably $C_1$-$C_4$-alkyl, optionally substituted by aryl, alkyl, aryloxy, alkyloxy, heteroatoms and/or heterocycles, k, l, m, q are each independently an integer from 1 to 10, preferably 1 to 5 and more preferably 1 to 3, and each $X_i$ for i=1 to k, 1 to l, 1 to m and 1 to q may independently be selected from the group of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O— and —CHPh-$CH_2$—O—, preferably from the group of —CH$_2$—CH$_2$—O—, —CH$_2$—CH(CH$_3$)—O— and —CH(CH$_3$)—CH$_2$—O—, and more preferably —CH$_2$—CH$_2$—O—,
in which Ph is phenyl and Vin is vinyl.

C$_1$-C$_{18}$-Alkyl therein, unsubstituted or substituted by aryl, alkyl, aryloxy, alkyloxy, heteroatoms and/or heterocycles, is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, preferably methyl, ethyl or n-propyl, most preferably methyl or ethyl.

Preference is given to (meth)acrylates of singly to vigintuply and more preferably triply to decuply ethoxylated, propoxylated or mixedly ethoxylated and propoxylated, and in particular exclusively ethoxylated, neopentyl glycol, glycerol, trimethylolpropane, trimethylolethane or pentaerythritol.

The low molecular weight (meth)acrylate (B) is present in up to 3 times the amount (weight) of the urethane (meth) acrylate (A), preferably in 0.1 to 2 times the amount, more preferably in 0.1 to 0.5 times the amount.

Preferably, such a formulation of (A) and (B) has at least 1.0 mol, preferably at least 1.5 mol and more preferably at least 2.0 mol of (meth)acrylate functions per kg of solids (sum total of (A) and (B)).

These coating compositions may comprise further constituents:

If the curing of the coating compositions is effected not with electron beams but by means of UV radiation, at least one photoinitiator which can initiate the polymerization of ethylenically unsaturated double bonds is preferably present.

Photoinitiators may be, for example, photoinitiators known to the skilled worker, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (Eds.), SITA Technology Ltd, London.

Possible options include, for example, mono- or bisacylphosphine oxides, as described, for example, in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO from BASF SE), ethyl 2,4,6-trimethylbenzoylphenylphosphinate (Lucirin® TPO L from BASF SE), bis(2,4,6-trimethylbenzoyl)phenylphosphine oxide (Irgacure® 819 from BASF SE), benzophenones, hydroxyacetophenones, phenylglyoxylic acid and its derivatives, or mixtures of these photoinitiators. Examples include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10 thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-di-iso-propylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin iso-propyl ether, 7H-benzoin methyl ether, benz[de]anthracene-7-one, 1-naphthaldehyde, 4,4'-bis(dimethylamino)benzophenone, 4-phenylbenzophenone, 4-chloro-benzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2 diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, 2-amylanthraquinone and butane-2,3-dione.

Also suitable are nonyellowing or low-yellowing photoinitiators of the phenylglyoxalic ester type, as described in DE-A 198 26 712, DE-A 199 13 353 or WO 98/33761.

Likewise conceivable as photoinitiators are polymeric photoinitiators, for example the diester of carboxymethoxybenzophenone with polytetramethylene glycols of varying molar mass, preferably 200 to 250 g/mol (CAS 515136-48-8), and also CAS 1246194-73-9, CAS 813452-37-8, CAS 71512-90-8, CAS 886463-10-1, or other polymeric benzophenone derivatives, of the kind available commercially, for example, under the Omnipol® BP trade name from Rahn AG, Switzerland.

In a preferred embodiment, the photoinitiators used are silsesquioxane compounds having at least one group with initiating activity, of the kind described in WO 2010/063612 A1, especially from page 2 line 21 to page 43 line 9 therein, hereby incorporated by reference as part of the present disclosure content, preferably from page 2 line 21 to page 30 line 5, and also the compounds described in the examples of WO 2010/063612 A1.

Typical mixtures comprise, for example, 2-hydroxy-2-methyl-1-phenylpropan-2-one and 1-hydroxycyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6 trimethylbenzoyldiphenylphosphine oxide and 2-hydroxy-2-methyl-1 phenylpropan-1-one, 2,4,6-trimethylbenzophenone and 4-methylbenzophenone or 2,4,6-trimethylbenzophenone, and 4-methylbenzophenone and 2,4,6 trimethylbenzoyldiphenylphosphine oxide.

Preference among these photoinitiators is given to 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenone, 1-benzoylcyclohexan-1-ol, 2-hydroxy-2,2-dimethylacetophenone, and 2,2-dimethoxy-2-phenylacetophenone.

The coating compositions comprise the photoinitiators preferably in an amount of 0.05 to 10% by weight, more preferably 0.1 to 8% by weight, especially 0.2 to 5% by weight, based on the total amount of the urethane (meth) acrylate (A).

The coating compositions may comprise further customary coatings additives, such as flow control agents, defoamers, UV absorbers, dyes, pigments and/or fillers.

Suitable fillers comprise silicates, for example silicates obtainable by hydrolysis of silicon tetrachloride, such as Aerosil® from Degussa, siliceous earth, talc, aluminum silicates, magnesium silicates, and calcium carbonates, etc. Suitable stabilizers comprise typical UV absorbers such as oxanilides, triazines and benzotriazole (the latter obtainable as Tinuvin® products from Ciba-Spezialitätenchemie), and benzophenones. They can be used alone or together with suitable free-radical scavengers, examples being sterically hindered amines such as 2,2,6,6-tetramethylpiperidine, 2,6-di-tert-butylpiperidine or derivatives thereof, for example bis(2,2,6,6-tetramethyl-4-piperidyl) sebacate. Stabilizers are typically used in amounts of 0.1 to 5.0% by weight, based on the "solid" components present in the preparation.

Pigments are virtually water-insoluble, finely divided organic or inorganic colorants as defined in DIN 55944. The procedure for production of inventive aqueous dispersions preferably proceeds from organic pigments, including carbon black. In addition, white pigments are equally preferred, especially titanium dioxide. Examples of pigments of particularly good suitability are given below.

Organic Pigments:
- Monoazo pigments: C.I. Pigment Brown 25; C.I. Pigment Orange 5, 13, 36 and 67; C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251;
- C.I. Pigment Yellow 1, 3, 73, 74, 65, 97, 151 and 183;
- Disazo pigments: C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188;
- Anthanthrone pigments: C.I. Pigment Red 168 (C.I. Vat Orange 3);
- Anthraquinone pigments: C.I. Pigment Yellow 147 and 177; C.I. Pigment Violet 31;
- Anthraquinone pigments: C.I. Pigment Yellow 147 and 177; C.I. Pigment Violet 31;
- Anthrapyrimidine pigments: C.I. Pigment Yellow 108 (C.I. Vat Yellow 20);
- Quinacridone pigments: C.I. Pigment Red 122, 202 and 206; C.I. Pigment Violet 19;
- Quinophthalone pigments: C.I. Pigment Yellow 138;
- Dioxazine pigments: C.I. Pigment Violet 23 and 37;
- Flavanthrone pigments: C.I. Pigment Yellow 24 (C.I. Vat Yellow 1);
- Indanthrone pigments: C.I. Pigment Blue 60 (C.I. Vat Blue 4) and 64 (C.I. Vat Blue 6);
- Isoindoline pigments: C.I. Pigment Orange 69; C.I. Pigment Red 260; C.I. Pigment Yellow 139 and 185;
- Isoindolinone pigments: C.I. Pigment Orange 61; C.I. Pigment Red 257 and 260; C.I. Pigment Yellow 109, 110, 173 and 185;
- Isoviolanthrone pigments: C.I. Pigment Violet 31 (C.I. Vat Violet 1);
- Metal complex pigments: C.I. Pigment Yellow 117, 150 and 153; C.I. Pigment Green 8;
- Perinone pigments: C.I. Pigment Orange 43 (C.I. Vat Orange 7); C.I. Pigment Red 194 (C.I. Vat Red 15);
- Perylene pigments: C.I. Pigment Black 31 and 32; C.I. Pigment Red 123, 149, 178, 179 (C.I. Vat Red 23), 190 (C.I. Vat Red 29) and 224; C.I. Pigment Violet 29;
- Phthalocyanine pigments: C.I. Pigment Blue 15, 15:1, 15:2, 15:3, 15:4, 15:6 and 16; C.I. Pigment Green 7 and 36;
- Pyranthrone pigments: C.I. Pigment Orange 51; C.I. Pigment Red 216 (C.I. Vat Orange 4);
- Thioindigo pigments: C.I. Pigment Red 88 and 181 (C.I. Vat Red 1); C.I. Pigment Violet 38 (C.I. Vat Violet 3);
- Triarylcarbonium pigments: C.I. Pigment Blue 1, 61 and 62; C.I. Pigment Green 1; C.I. Pigment Red 81, 81:1 and 169; C.I. Pigment Violet 1, 2, 3 and 27; C.I. Pigment Black 1 (Aniline Black);
- C.I. Pigment Yellow 101 (aldazine yellow);
- C.I. Pigment Brown 22;

Inorganic Pigments:
- White pigments: titanium dioxide (C.I. Pigment White 6), zinc white, pigment grade zinc oxide, barium sulfate, zinc sulfide; lead white; calcium carbonate;
- Black pigments: iron oxide black (C.I. Pigment Black 11), iron-manganese black, spinel black (C.I. Pigment Black 27); carbon black (C.I. Pigment Black 7);
- Chromatic pigments: chromium oxide, chromium oxide hydrate green; chromium green (C.I. Pigment Green 48); cobalt green (C.I. Pigment Green 50); ultramarine green; cobalt blue (C.I. Pigment Blue 28 and 36); ultramarine blue; iron blue (C.I. Pigment Blue 27); manganese blue; ultramarine violet; cobalt violet and manganese violet; iron oxide red (C.I. Pigment Red 101); cadmium sulfoselenide (C.I. Pigment Red 108); molybdate red (C.I. Pigment Red 104); ultramarine red; iron oxide brown, mixed brown, spinel and corundum phases (C.I. Pigment Brown 24, 29 and 31), chromium orange;
  iron oxide yellow (C.I. Pigment Yellow 42); nickel titanium yellow (C.I. Pigment Yellow 53; C.I. Pigment Yellow 157 and 164); chromium titanium yellow; cadmium sulfide and cadmium zinc sulfide (C.I. Pigment Yellow 37 and 35); chromium yellow (C.I. Pigment Yellow 34), zinc yellow, alkaline earth metal chromates; naples yellow; bismuth vanadate (C.I. Pigment Yellow 184);
- Interference pigments: metal effect pigments based on coated metal platelets; pearlescent pigments based on metal oxide-coated mica platelets; liquid-crystal pigments.

Preferred pigments in this context include monoazo pigments (especially laked BONS pigments, naphthol AS pigments), disazo pigments (especially diaryl yellow pigments, bisacetoacetanilide pigments, disazopyrazolone pigments), quinacridone pigments, quinophthalone pigments, perinone pigments, phthalocyanine pigments, triarylcarbonium pigments (alkali blue pigments, laked rhodamines, dye salts with complex anions), isoindoline pigments, white pigments and carbon blacks.

Specific examples of particularly preferred pigments are: carbon black, titanium dioxide, C.I. Pigment Yellow 138, C.I. Pigment Red 122 and 146, C.I. Pigment Violet 19, C.I. Pigment Blue 15:3 and 15:4, C.I. Pigment Black 7, C.I. Pigment Orange 5, 38 and 43 and C.I. Pigment Green 7.

The inventive dispersions are of particular suitability as an aqueous coating composition or in aqueous coating compositions, more preferably for coating of substrates such as wood, paper, textile, leather, fleece, plastics surfaces, glass, ceramic, mineral building materials, such as cement blocks and fiber cement boards, and especially of metals or coated metals.

The substrates may optionally have been pretreated and/or precoated; for example, plastics films can be treated with corona discharges prior to application, or precoated with a primer.

Among the plastics, particular emphasis should be given to polycarbonate, polyethylene, for example PE, HDPE, LDPE, polypropylene, for example PP, oriented PP (OPP), bisaxially oriented PP (BOPP), polyamide, for example Nylon®, and polyethylene terephthalate (PET).

Preferred substrates are paper, especially newsprint, paperboard, cardboard, polyester-comprising films, polyethylene-comprising films and polypropylene-comprising films, and also glass. Plastics films may optionally also be metallized.

Particularly advantageously, the inventive dispersions can be used to coat wood and woodbase materials, and wood-containing substrates such as fiberboard. Also conceivable would be the coating of substrates containing cellulose fiber, for example paper, paperboard or cardboard. Most preferably, the dispersions are suitable for coating of oak, spruce, pine, beech, maple, walnut, macore, chestnut, plane, *robinia*, ash, birch, stone pine and elm, and also cork.

The inventive dispersions can be used alone or as a mixture, and they then increase the pigmentability of the formulation.

The substrates are coated by customary processes known to those skilled in the art, by applying at least one coating composition to the substrate to be coated in the desired thickness and removing the volatile constituents from the coating compositions. This operation may be repeated once or more than once if desired. Application to the substrate can be effected in a known manner, for example by spraying, troweling, knifecoating, brushing, rolling, roller coating or pouring. The coating thickness is generally within a range from about 3 to 400 g/m$^2$, preferably 10 to 200 g/m$^2$ and more preferably 10 to 80 g/m$^2$.

Optionally, when a plurality of layers of the coating composition are applied one on top of another, each coating operation may be followed by radiation curing and an intermediate grinding operation.

Radiation curing is accomplished by exposure to high-energy radiation, i.e. UV radiation or daylight, preferably light with a wavelength of 250 to 600 nm, or by irradiation with high-energy electrons (electron beams; 150 to 300 keV). Examples of radiation sources used include high-pressure mercury vapor lamps, lasers, pulsed lamps (flash-light), halogen lamps or excimer lamps. The radiation dose normally sufficient for crosslinking in the case of UV curing is in the range from 80 to 3000 mJ/cm$^2$. Preference is given to low-pressure mercury lamps, medium-pressure lamps with high-pressure lamps, which may optionally have been doped with gallium or iron, and additionally to LED lamps.

Irradiation can optionally also be carried out in the absence of oxygen, for example under an inert gas atmosphere. Suitable inert gases are preferably nitrogen, noble gases, carbon dioxide, or combustion gases. In addition, irradiation can be effected by covering the coating composition with transparent media. Transparent media are, for example, polymeric films, glass or liquids, e.g., water. Particular preference is given to irradiation in the manner as described in DE-A1 199 57 900.

In a preferred process, curing is effected continuously, by passing the substrate treated with the coating composition at constant speed past a radiation source. For this it is necessary that the cure rate of the coating composition be sufficiently high.

This varied course of curing over time can be exploited particularly when the coating of the article is followed by another processing step in which the film surface comes into direct contact with another article or is worked on mechanically.

The present invention further provides printing inks comprising at least one inventive urethane (meth)acrylate (A) and preferably at least one pigment.

A further aspect of the present invention is a process for producing inventive printing inks for printing methods. In the process of the invention for producing printing inks for printing methods, at least one inventive aqueous dispersion, water, optionally at least one pigment and optionally at least one additive are mixed with one another, for example in one or more steps.

Inventive printing inks for printing methods may comprise further additives, as customary particularly for aqueous printing inks and in the printing and coatings industries. Examples include preservatives, for example 1,2-benzisothiazolin-3-one (commercially available as Proxel brands from Avecia Lim.) and its alkali metal salts, glutaraldehyde and/or tetramethylolacetylenediurea, Protectols®, antioxidants, degassers/defoamers, for example acetylenediols and ethoxylated acetylenediols, which typically comprise 20 to 40 mol of ethylene oxide per mole of acetylenediol and may also have a dispersing effect, viscosity regulators, flow control aids, wetters (for example wetting surfactants based on ethoxylated or propoxylated fatty alcohols or oxo alcohols, propylene oxide-ethylene oxide block copolymers, ethoxylates of oleic acid or alkylphenols, alkylphenol ether sulfates, alkyl polyglycosides, alkyl phosphonates, alkylphenyl phosphonates, alkyl phosphates, alkylphenyl phosphates or preferably polyethersiloxane copolymers, especially alkoxylated 2-(3-hydroxypropyl)heptamethyltrisiloxanes, which generally comprise a block of 7 to 20 and preferably 7 to 12 ethylene oxide units and a block of 2 to 20 and preferably 2 to 10 propylene oxide units and may be present in the colorant preparations in amounts of 0.05% to 1% by weight), antisettling agents, luster improvers, glidants, adhesion improvers, antiskinning agents, delusterants, emulsifiers, stabilizers, hydrophobizers, light-stabilizing additives, hand improvers, antistats, bases, for example triethanolamine, or acids, specifically carboxylic acids, for example lactic acid or citric acid, to regulate the pH. If these agents are part of the inventive printing inks for printing methods, the total amount thereof is generally 2% by weight, especially 1% by weight, based on the weight of the inventive coloring preparations and especially of the inventive printing inks for printing methods.

Inventive printing inks for printing methods may further comprise a further photoinitiator.

In one embodiment of the present invention, inventive printing inks for printing methods have a dynamic viscosity in the range from 10 to 2000 mPa·s, preferably 10 to 1500 mPa·s, more preferably 10 to 1250 mPa·s, and most preferably 10 to 1000 mPas, measured at 23° C. to DIN 53018.

To adjust the viscosity, it may be necessary to add a thickener to the printing ink to adjust the viscosity.

In one embodiment of the present invention, the surface tension of inventive printing inks for printing methods is 25 to 70 mN/m, especially 30 to 60 mN/m, measured at 25° C. to DIN 53993.

In one embodiment of the present invention, the pH of inventive printing inks for printing methods is 5 to 10, preferably 7 to 10.

Inventive printing inks for printing methods show altogether advantageous application properties and good drying characteristics, and produce printed images of high quality, i.e. of high brilliance and depth of shade, and high fastness to rubbing, light, water and wet rubbing. They are particularly suitable for printing on coated and uncoated paper, and also cardboard and PE/PP/PET films. It is a particular advantage of the inventive printing inks that they exhibit improved redissolution of printing ink residues adhering to print rolls or print platens, these residues originating from a prior print operation or else having partly dried after stoppage of the print operation. Such improved redissolution is advantageous especially, but not only, in the case of printing by the relief printing method.

A further aspect of the present invention is a method for printing flat or three-dimensional, preferably flat, substrates by a printing method other than inkjet printing, using at least one inventive printing ink. In a preferred variant of the inventive printing method, at least one inventive printing ink is printed onto a substrate and then treated with actinic radiation.

Printing methods in which the inventive printing inks can be used are preferably offset printing, relief printing, flexographic printing, gravure printing and intaglio printing, more preferably flexographic printing and gravure printing.

In the so-called mechanical printing methods, such as offset printing, relief printing, flexographic printing or intaglio printing, the printing ink is transferred to the print stock by contact of a print platen or print form which has been inked with printing ink with the print stock. Printing inks for these applications typically comprise solvent, colorant, binder, and optionally various additives. Binders serve to form the ink film and to anchor the constituents, for example pigments or fillers, in the ink film. According to consistency, printing inks for these applications typically comprise between 10 and 50% by weight of binder.

Printing varnishes are applied either as a primer to the print stock or as a coating to the printed print stock after the print operation. Printing varnishes are used, for example, to protect the printed image, to improve the adhesion of the printing ink on the print stock, or for esthetic purposes. The application is typically effected in-line, by means of a varnishing unit in the print machine.

Printing varnishes do not comprise any colorant, but apart from that are generally of similar composition to printing inks.

Printing inks for mechanical printing methods include what are called pasty printing inks having high viscosity for offset and relief printing, and what are called fluid printing inks having comparatively low viscosity for flexographic and intaglio printing.

In a preferred embodiment of the present invention, the flexographic printing operation can be effected, for example, by printing the optionally pretreated substrate to be coated successively at individual print stations with differently pigmented inventive printing inks. Between the individual print stations, preferably at least partial drying is effected, more preferably full drying.

Preferably, the individual print stations, along with the drying stations, are arranged around a central roll, but it is also possible to transport the substrate over one roll in each individual print station using deflecting means.

After running through all the print stations, the finished printed image is dried and fully cured with electron beams.

The inventive printing inks and printing varnishes may optionally comprise further additives and auxiliaries. Examples of additives and auxiliaries are fillers such as calcium carbonate, aluminum oxide hydrate, or aluminum silicate or magnesium silicate. Waxes increase abrasion resistance and serve to increase lubrication.

Examples are especially polyethylene waxes, oxidized polyethylene waxes, petroleum waxes or ceresin waxes. Fatty acid amides can be used to increase the smoothness of the surface.

Plasticizers serve to increase the elasticity of the dried film. Examples are phthalic esters such as dibutyl phthalate, diisobutyl phthalate, dioctyl phthalate, citric esters or esters of adipic acid. To disperse the pigments, it is possible to use dispersing aids. In the inventive fluid printing inks or printing varnishes, it is advantageously possible to dispense with adhesion promoters, although there is no intention to rule out the use of adhesion promoters. The total amount of all the additives and auxiliaries typically does not exceed 20% by weight based on the sum total of all the constituents, and is preferably 0-10% by weight.

The layer thickness with which the inventive printing inks are applied to the substrate differs according to the printing method and may, for example, be up to 10 μm, preferably 0.1 to 8 μm, more preferably 0.2 to 7 μm, even more preferably 1 to 5 μm and especially 1 to 4 μm.

For relief printing/flexographic printing typical printing ink layer thicknesses are 2-4 μm, for offset printing 1-2 μm, for intaglio printing 2-8 μm, and for screen printing 20-30 μm.

Inventive printing inks for printing methods can be cured by actinic radiation; for example, actinic radiation having a wavelength range from 200 nm to 450 nm is suitable. For example, actinic radiation having an energy within the range from 70 mJ/cm$^2$ to 2000 mJ/cm$^2$ is suitable. Actinic radiation can appropriately be introduced, for example, continuously or in the form of flashes.

A preferred embodiment of the present invention involves conducting the curing of the printing inks by means of electron beams in suitable electron flash units, for example with an energy in the range from 70 to 300 keV, preferably 150 to 200 keV. It is an advantage of performing the curing by means of electron beams that the printing inks thus cured generally have better rub-fastness than printing inks cured with UV light.

In the case that curing is performed by means of electron beams, the inventive printing ink preferably does not comprise any photoinitiator (E). This has the advantage that no migratable constituents of photoinitiators which arise through the irradiation remain in the coating. This is especially advantageous when the coatings are intended for contact with food and drink.

The distance from the electron flash units to the print surface is between 1 and 100 cm, preferably 5 to 50 cm.

Of course, it is also possible to use a plurality of radiation sources for the curing operation, in order to achieve the radiation dose required for the optimal curing.

In one embodiment of the present invention, the printing operation may be followed and the treatment with actinic radiation preceded by intermediate drying, for example thermally or with IR radiation. Suitable conditions are, for example, temperatures in the range from 30 to 120° C. over a period in the range from 10 seconds to 24 hours, preferably up to 30 min, more preferably up to 5 min. Suitable IR radiation is, for example, IR radiation within a wavelength range above 800 nm. Suitable devices for intermediate drying are, for example, drying cabinets or vacuum drying cabinets for thermal intermediate drying, and additionally IR lamps.

The heat evolved in the course of exposure to actinic radiation can also have an intermediate drying effect.

Inventive printing inks and prints which are produced using inventive printing inks can, however, also be cured thermally, with or without exposure to actinic radiation. For example, it is possible by drying at temperatures in the range from 25 to 150° C., preferably 100 to 150° C., more preferably 120 to 150° C., to fix prints produced using inventive printing inks.

In a preferred embodiment, the irradiation can also be performed with exclusion of oxygen or under an oxygen-depleted atmosphere, for example at a partial oxygen pressure of less than 18 kPa, preferably 0.5-18 kPa, more preferably 1-15 kPa, even more preferably 1 to 10 kPa and especially 1-5 kPa, or under an inert gas atmosphere. Suitable inert gases are preferably nitrogen, noble gases, carbon dioxide, water vapor or combustion gases. The partial oxygen pressure can also be reduced by lowering the ambient pressure.

The advantage of the aqueous coating compositions is that the dispersed urethane (meth)acrylates have a high stability, and exhibit good pigmentation properties in conjunction with pigments.

The invention is illustrated in detail by the nonlimiting examples which follow.

EXAMPLE 1

In a stirred tank, 69 parts dimethylolpropionic acid, 19 parts neopentyl glycol, 144 parts Lupraphen® VP 9327 (BASF SE; polyester diol based on adipic acid, isophthalic acid and cyclohexanedimethanol, having a mean OH number of 140 mgKOH/g), 29 parts 2-hydroxyethyl acrylate, 62 parts Pluriol®A1020E (BASF SE; methanol-started polyethylene glycol having a mean OH number of 50 mgKOH/g) and 1 part Kerobit® TBK (BASF SE; 2,6-di-t-butylcresol) were homogenized in 350 parts acetone, followed by parallel metered addition, within 20 min, of 463 parts Laromer® LR 9000 (BASF SE; unsaturated polyisocyanate based on 2-hydroxyethyl acrylate and hexamethylene diisocyanate having an isocyanate equivalent weight of about 290 g/mol) and parts hexamethylene diisocyanate. The reaction mixture was heated to 65° C. and left to react down to a residual isocyanate content of 0.9% by weight of NCO. After dilution of the prepolymer obtained with 300 parts acetone, the residual isocyanate content was converted by reaction with 25 parts diethanolamine. After neutralization of the reaction mixture with 203 parts 10% sodium hydroxide solution in water and dispersion by addition of 1200 parts water, the acetone was distilled off to obtain a dispersion having 39% by weight solids, a pH of 7.5, a viscosity of 300 mPa·s and a weight-average molecular weight of 12 000 g/mol.

COMPARATIVE EXAMPLE 1 (TRIETHYLAMINE NEUTRALIZATION)

In a stirred tank, 41 parts dimethylolpropionic acid, 11 parts neopentyl glycol, 86 parts Lupraphen® VP 9327 (BASF SE; polyester diol based on adipic acid, isophthalic acid and cyclohexanedimethanol, having a mean OH number of 140 mgKOH/g), 17 parts 2-hydroxyethyl acrylate, 37 parts Pluriol®A1020E (BASF SE; methanol-started polyethylene glycol having a mean OH number of 50 mgKOH/g) and 0.5 part Kerobit® TBK (BASF SE; 2,6-di-t-butylcresol) were homogenized in 210 parts acetone, followed by parallel metered addition, within 20 min, of 278 parts Laromer® LR 9000 (BASF SE; unsaturated polyisocyanate based on 2-hydroxyethyl acrylate and hexamethylene diisocyanate having an isocyanate equivalent weight of about 290 g/mol) and 21 parts hexamethylene diisocyanate. The reaction mixture was heated to 65° C. and left to react down to a residual isocyanate content of 0.9% by weight of NCO. After dilution of the prepolymer obtained with 200 parts acetone, the residual isocyanate content was converted by reaction with 14 parts diethanolamine. After neutralization of the reaction mixture with 32 parts triethylamine in water and dispersion by addition of 810 parts water, the acetone was distilled off to obtain a dispersion having 39% by weight solids, a pH of 7.4, a viscosity of 1100 mPa·s and a weight-average molecular weight of 23 000 g/mol.

COMPARATIVE EXAMPLE 2 (NO PLURIOL A1020E AND TRIETHYLAMINE NEUTRALIZATION)

In a stirred tank, 44 parts dimethylolpropionic acid, 12 parts neopentyl glycol, 92 parts Lupraphen® VP 9327 (BASF SE; polyester diol based on adipic acid, isophthalic acid and cyclohexanedimethanol, having a mean OH number of 140 mgKOH/g), 23 parts 2-hydroxyethyl acrylate and 0.5 part Kerobit® TBK (BASF SE; 2,6-di-t-butylcresol) were homogenized in 210 parts acetone, followed by parallel metered addition, within 20 min, of 296 parts Laromer® LR 9000 (BASF SE; unsaturated polyisocyanate based on 2-hydroxyethyl acrylate and hexamethylene diisocyanate having an isocyanate equivalent weight of about 290 g/mol) and 22 parts hexamethylene diisocyanate. The reaction mixture was heated to 65° C. and left to react down to a residual isocyanate content of 0.9% by weight of NCO. After dilution of the prepolymer obtained with 200 parts acetone, the residual isocyanate content was converted by reaction with 17 parts diethanolamine. After neutralization of the reaction mixture with 33 parts triethylamine and dispersion by addition of 810 parts water, the acetone was distilled off to obtain a dispersion having 39% by weight solids, a pH of 7.6, a viscosity of 3300 mPa·s and a weight-average molecular weight of 38 000 g/mol.

Properties:

| | Example 1 | Comparative example 1 | Comparative example 2 |
|---|---|---|---|
| pH[1], | 7.5 | 7.4 | 7.6 |
| Viscosity, mPa · s[1] (t = 0 d, 25° C.) | 300 | 1100 | 3300 |
| pH[1] | 7.3 | 6.5 | 6.2 |
| Viscosity, mPa · s[1] (t = 30 d, T = 25° C.) | 260 | 900 | 3150 |
| pH[1] | 7.2 | 5.5 (sediment) | 5.1 (sediment) |
| Viscosity, mPa · s[1] (t = 10 d, T = 40° C.) | 230 | 330 | 600 |
| pH[1] | 7.0 | gelated | gelated |
| Viscosity, mPa · s[1] (t = 30 d, T = 40° C.) | 210 | | |

[1]Property of the dispersion produced

It can be seen that the inventive dispersion, even after storage over a prolonged period, retains its stability, whereas the dispersions according to the comparative examples lose their properties.

The invention claimed is:

1. A radiation-curable, water-dispersible urethane (meth)acrylate (A) essentially formed from
   (a) at least one (cyclo)aliphatic di- and/or polyisocyanate,
   (b1) at least one (cyclo)aliphatic diol having a molar mass of less than 700 g/mol,
   (b2) at least one polyester diol having a weight-average molar mass Mw of 700 to 2000,
       wherein 5 to 35 mol %, based on the total isocyanate functions in (a), of hydroxyl functions in the sum total of (b1) and (b2),
   (c) at least one compound (c) having at least one isocyanate-reactive group and at least one free-radically polymerizable unsaturated group, wherein component (c) is selected from the group consisting of 2-hydroxyethyl acrylate, 2-hydroxyethyl methacrylate, 2-hydroxypropyl acrylate, 3-hydroxypropyl acrylate, 2-butane-1,4-diol monoacrylate, 3-butane-1,4-diol monoacrylate, 1,2-diacrylate of glycerol, 1,3-diacrylate of glycerol, trimethylolpropane diacrylate, pentaerythrityl triacrylate, ditrimethylolpropane triacrylate and dipentaerythrityl pentaacrylate,
  wherein 20 to 80 mol %, based on the total isocyanate functions in (a), of hydroxyl functions in the sum total of (c),
(d) at least one compound having at least one isocyanate-reactive group and at least one acid group,
  wherein 20 to 60 mol %, based on the total isocyanate functions in (a), of hydroxyl functions in the sum total of (d),
(e) at least one base of an alkali metal for at least partial neutralization of the acid groups of component (d),
  wherein 60 to 100 mol %, based on acid functions in (d), of in the sum total of base (e),
(f) optionally at least one monoalcohol having exactly one hydroxyl function, or at least one mono- and di-C1-C4-alkylamine,
  wherein 0 to 30 mol %, based on the total isocyanate functions in (a), of hydroxyl or amino functions which react with isocyanate in the sum total of base (f),
(g) at least one monofunctional polyalkylene oxide polyether alcohol
  wherein 0.5 to 10 mol %, based on the total isocyanate functions in (a), of hydroxyl functions in the sum total of (g)
  with the proviso that the sum total in components (b), (c), (d), and (g) is 70 to 100 mol % of isocyanate-reactive groups based on total isocyanate functions in (a)).

2. The urethane (meth)acrylate according to claim 1, wherein component (a) is a mixture of a cycloaliphatic or aliphatic monomeric diisocyanate (a1) and a polyisocyanate (a2) based on a cycloaliphatic or aliphatic monomeric diisocyanate.

3. The urethane (meth)acrylate according to claim 2, wherein component (a1) is selected from the group consisting of hexamethylene diisocyanate, 1,3-bis(isocyanatomethyl)cyclohexane, isophorone diisocyanate, 2,4'-di(isocyanatocyclohexyl)methane, and 4,4'-di(isocyanatocyclohexyl)methane.

4. The urethane (meth)acrylate according to claim 2, wherein the polyisocyanate (a2) is a polyisocyanate having isocyanurate groups, uretdione diisocyanate, polyisocyanate having biuret groups, polyisocyanate having urethane or allophanate groups.

5. The urethane (meth)acrylate according to claim 2, wherein the polyisocyanate (a2) is a compound of the formula

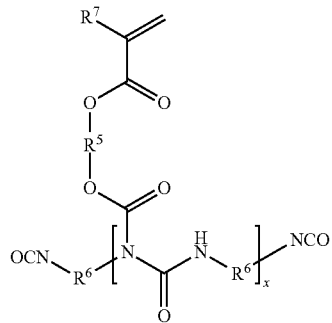

in which
  R5 is a divalent alkylene radical which has 2 to 12 carbon atoms and may optionally be substituted by C1- to C4-alkyl groups and/or be interrupted by one or more oxygen atoms,
  R6 is a divalent alkylene radical or cycloalkylene radical which has 2 to 20 carbon atoms and may optionally be substituted by C1- to C4-alkyl groups and/or be interrupted by one or more oxygen atoms,
  R7 is hydrogen or methyl, and
  X is a positive number having a statistical average of 2 to 6.

6. The urethane (meth)acrylate according to claim 1, wherein component (b1) is selected from the group consisting of ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, heptane-1,7-diol, octane-1,8-diol, octane-1,2-diol, nonane-1,9-diol, decane-1,2-diol, decane-1,10-diol, dodecane-1,2-diol, dodecane-1,12-diol, 1,5-hexadiene-3,4-diol, neopentyl glycol, 2-butyl-2-ethylpropane-1,3-diol, 2-methylpentane-2,4-diol, 2,4-dimethylpentane-2,4-diol, 2-ethylhexane-1,3-diol, 2,5-dimethylhexane-2,5-diol, 2,2,4-trimethylpentane-1,3-diol, pinacol, diethylene glycol, triethylene glycol, dipropylene glycol, and tripropylene glycol.

7. The urethane (meth)acrylate according to claim 1, wherein component (b2) is a polyester diol having a weight-average molar mass Mw of 700 to 2000 g/mol and an acid number to DIN 53240 of not more than 20 mg KOH/g.

8. The urethane (meth)acrylate according to claim 1, wherein component (d) is dimethylolpropionic acid.

9. The urethane (meth)acrylate according to claim 1, wherein component (f) is present and is a mono-, di-C1-C4-alkylamine, mono- or dialkanolamine.

10. The urethane (meth)acrylate according to claim 1, wherein component (f) is present and is selected from the group consisting of diethylamine, di-n-butylamine, ethanolamine, propanolamine, N,N-dipropanolamine and N,N-diethanolamine.

11. An aqueous coating composition comprising
  the urethane (meth)acrylate according to claim 1,
  optionally a low molecular weight (meth)acrylate (B) which is soluble or dispersible in an aqueous dispersion of the urethane (meth)acrylate (A),
  optionally a pigment, and
  optionally a photoinitiator.

12. An article of wood, paper, textile, leather, fleece, plastics surfaces, glass, ceramic, mineral building materials, cement blocks, fiber cement boards, metals or coated metals, coated by the coating composition according to claim 11.

13. A printing ink comprising the coating composition according to claim 11.

14. A method comprising printing on polycarbonate, polyethylene, polypropylene, polyamide, polyethylene terephthalate (PET), or paper with the printing ink according to claim 13.

15. An aqueous dispersion comprising the urethane (meth)acrylate of claim 1, wherein the aqueous dispersion is capable of storage for 10 days at a temperature of 40° C. without sedimentation.

16. An aqueous dispersion comprising the urethane (meth)acrylate of claim 1, wherein the aqueous dispersion is capable of storage for 30 days at a temperature of 40° C. without gelation.

17. The aqueous dispersion comprising the urethane (meth)acrylate of claim 15, wherein the aqueous dispersion is capable of storage for 30 days at a temperature of 40° C. without gelation.

\* \* \* \* \*

UNITED STATES PATENT AND TRADEMARK OFFICE
CERTIFICATE OF CORRECTION

PATENT NO. : 10,131,814 B2
APPLICATION NO. : 14/914426
DATED : November 20, 2018
INVENTOR(S) : Sebastian Berger et al.

Page 1 of 1

It is certified that error appears in the above-identified patent and that said Letters Patent is hereby corrected as shown below:

On the Title Page

In Column 2, item (56), under foreign patent documents, Line 17, delete "8/1932" and insert -- 8/1982 --, therefor;

In Column 2, item (56), under foreign patent documents, Line 18, delete "1/1934" and insert -- 1/1984 --, therefor;

In Column 2, item (56), under foreign patent documents, Line 19, delete "11/1934" and insert -- 11/1984 --, therefor.

In the Specification

In Column 3, Lines 53-54, delete "isocyanatoisocyanurates" and insert -- isocyanato-isocyanurates --, therefor.

In Column 14, Lines 30-32, delete "Otherwise, the figures for the sum total of components (a1) and (a2) are of course based only on the one component (a)." and insert the same on Column 14, Line 29, after "from 1:3 to 1:4." as a continuation of the same paragraph.

In the Claims

In Column 29, Line 32, Claim 1, delete "(a))." and insert -- (a). --, therefor.

Signed and Sealed this
Twenty-eighth Day of April, 2020

Andrei Iancu
*Director of the United States Patent and Trademark Office*